Patented June 2, 1925.

1,540,666

UNITED STATES PATENT OFFICE.

KARL THIESS, OF LINDLINGEN, NEAR HOECHST-ON-MAIN, GERMANY, ASSIGNOR TO FARBWERKE VORM. MEISTER LUCIUS & BRUNING, OF HOECHST-ON-MAIN, GERMANY, A CORPORATION OF GERMANY.

MONOAZO DYESTUFF.

No Drawing. Application filed October 8, 1923. Serial No. 667,411.

*To all whom it may concern:*

Be it known that I, KARL THIESS, a citizen of Germany, residing at Lindlingen, near Hoechst-on-Main, Germany, have invented certain new and useful Improvements in Monoazo Dyestuffs, of which the following is a specification.

I have made the observation that monoazo dyestuffs which are very suitable for industrial purposes can be obtained by the usual methods from diazotized m-aminobenzaldehydes and 2.6.8-and 1.4.7-naphtholdisulfonic acids- and naptholtrisulfonic acids. According to German Patent No. 175,666 azo dyestuffs prepared from m-aminobenzaldehyde and naphtholmonosulfonic acids are condensed with 1.2-diaminonaphthalenesulfonic acids in order to prepare polyazo dyestuffs for cotton. In the corresponding U. S. Patent No. 807,119 it is moreover stated that instead of the 2.6.-naphtholmonosulfonic acid other monosulfonic acids and disulfonic acids can be used. From the azo dyestuffs obtained from m-aminobenzaldehyde and naphtholmonosulfonic acids and naphtholdisulfonic acids the dyestuffs of my present invention are distinguished by their considerably greater fastness to water, a property which is of special value in certain branches of wool dyeing. They possess besides a good equalizing property, a great fastness to alkalies and to fulling and a very great fastness to water. Their fastness to the action of sulfur and to steaming is also remarkable, and their fastness to light is very satisfactory. Therefore the monoazodyestuffs prepared from diazotized m-aminobenzaldehydes and naphthol 2.6.8- and 1.4.7-disulfonic acids- and trisulfonic acids constitute a new species of dyestuffs possessing very desirable improvements in the class of fast acid wool dyestuffs. The said dyestuffs are also suitable for printings on wool.

The dyestuffs are represented by the general formula:

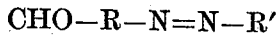

wherein R is a benzene residue substituted in any way and R′ stands for one of the naphthol—2.6.8 and 1.4.7 disulfonic acid and naphthol trisulfonic acid residues. They dye wool orange-yellow to red fast tints; form deeply colored powders which are readily soluble in hot water and dissolve in concentrated sulfuric acid with a characteristic coloration; and contain the free aldehyde group and show therefore the reactions characteristic for the said group, for instance, the formation of bisulfite compounds readily soluble in cold water and condensation with o-hydroxycarboxylic acids of the benzene and naphthalene series to leuco triarylmethane dyestuffs.

The following examples illustrate my invention:

1. 121 parts by weight of m-aminobenzaldehyde or 112 parts by weight of the anhydro compound are diazotized in the usual manner and coupled in a soda alkaline solution with 304 parts by weight of the 2-naphthol-6.8-disulfonic acid. The formation of the dyestuff at once sets in and is completed by stirring for several hours at 20–25°. The dyestuff isolated in the known manner by salting out, dyes wool in an acid bath clear orange-yellow tints.

The dyestuff has probably the formula:

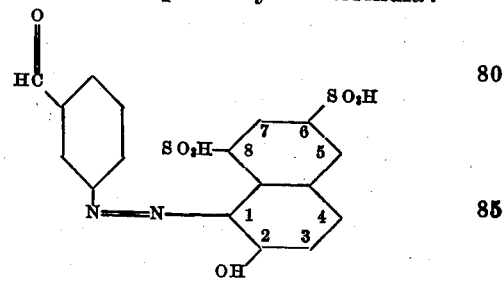

2. The replacing of the 2-naphthol-6-8-disulfonic acid of Example 1 by 304 parts by weight of the 1-naphthol-4.7-disulfonic acid leads to a dyestuff giving red tints of a yellow hue.

3. By replacing in Example 1 the disulfonic acid by 384 parts by weight of 2-naphthol-3.6.8-trisulfonic acid there is obtained a dyestuff giving yellow-red tints.

4. If in Example 1 there are used 156 parts of 2-chloro-5-aminobenzaldehyde, the dyestuff thus obtained gives reddish-yellow tints.

Instead of m-aminobenzaldehyde and its substitution products there may be used as well compounds splitting off m-aminobenzaldehyde in being diazotized as for instance oximes, hydrazones, aldazines.

5. 201 kg. of 5-amino-2-sulfobenzaldehyde are diazotized in the usual manner with 69 kg. of sodium nitrite and coupled at 0.5° in a soda alkaline solution with 304 kg. of 2-naphthol-6.8-disulfonic acid. The dyestuff is then salted out; it is soluble in cold water and dyes wool fast orange tints.

6. The diazo solution from 156 kg. of 4-chloro-5-aminobenzaldehyde is coupled at 0-5° in a soda alkaline solution with 304 kg. of 1-naphthol-4.7-disulfonic acid. The formation of the dyestuff sets in at once and is completed by continuing the stirring at 20-25°. The dyestuff is then salted out and dyes wool fine red tints.

Having now described my invention what I claim is:

As new articles of manufacture the monoazo dyestuffs obtainable by coupling the diazo compounds of m-aminobenzaldehyde and its substitution products and also compounds splitting off in being diazotized m-aminobenzaldehyde with naphthol-2.6-8- and 1.4.7-disulfonic acids- and naphthol-trisulfonic acids possessing the general formula:

$$CHO-R-N=N-R^1$$

wherein R is a benzene residue substituted in any way and R' stand for one of the naphthol-2.6.8 and 1.4.7 disulfonic acid and naphthol trisulfonic acid residues; the said new dyestuffs dyeing wool orange yellow to red fast tints, forming deeply colored powders which are readily soluble in hot water, dissolving in concentrated sulfuric acid with a characteristic coloration and containing the free aldehyde group and showing therefore the reactions characteristic for the said group, for instance the formation of bisulfite compounds readily soluble in cold water and condensation with o-hydroxycarboxylic acids of the benzene and naphthalene series to leuco triarylmethane dyestuffs.

In testimony whereof, I affix my signature.

KARL THIESS.

Witnesses:
M. W. ALTAFFER,
C. C. L. B. WYLES.